United States Patent [19]

Toaspern et al.

[11] Patent Number: 4,591,310

[45] Date of Patent: May 27, 1986

[54] METHOD FOR LOADING AND UNLOADING LARGE AREA TRANSPORTATION MEANS

[76] Inventors: Jörg Toaspern, Buchsbaumweg 10; Anton Grosshauser, Bi de Windmöl 1 e, both of D-2000 Schenefeld, Fed. Rep. of Germany

[21] Appl. No.: 700,066

[22] Filed: Feb. 11, 1985

Related U.S. Application Data

[63] Continuation of Ser. No. 555,423, Nov. 23, 1983, abandoned, which is a continuation of Ser. No. 387,001, Jun. 10, 1982, abandoned.

[30] Foreign Application Priority Data

Jul. 1, 1981 [DE] Fed. Rep. of Germany ....... 3125880

[51] Int. Cl.[4] .............................................. B65G 67/60
[52] U.S. Cl. .................................... 414/786; 198/586; 198/607; 414/139
[58] Field of Search ................ 198/586, 607; 414/139, 414/144, 786

[56] References Cited

U.S. PATENT DOCUMENTS

| 2,125,088 | 7/1938 | Sinden | 414/139 |
| 3,297,141 | 1/1967 | Janitsch et al. | 198/586 X |
| 4,203,512 | 5/1980 | Ammeraal | 198/586 X |
| 4,269,302 | 5/1981 | Garvey | 198/607 |

FOREIGN PATENT DOCUMENTS

| 1290875 | 3/1969 | Fed. Rep. of Germany | 414/139 |
| 2813192 | 9/1979 | Fed. Rep. of Germany | 414/144 |
| 0113164 | 9/1979 | Japan | 414/139 |

*Primary Examiner*—Robert J. Spar
*Assistant Examiner*—Janice Krizek
*Attorney, Agent, or Firm*—Andrus, Sceales, Starke & Sawall

[57] ABSTRACT

The invention relates to a method for loading and unloading large area transporters, such as ships or the like, using a vertically spirally curved conveyor connected to the goods loading and unloading apparatus. The goods to be conveyed are discharged from or placed on a pivotable and optionally telescopable horizontal conveyor arranged on its lower end portion. During loading and unloading, the goods transfer spiral which is in fixed operative connection with the horizontal conveyor is moved over the complete pivoting area in congruent manner to the lower spiral conveyor segment of the vertical conveyor. The goods transfer spiral is moved beneath the lower spiral conveyor segment for loading purposes and above the lower spiral conveyor segment for unloading purposes in such a way that an overlapping zone is always formed between the lower spiral conveyor segment and the goods transfer spiral.

1 Claim, 6 Drawing Figures

4,591,310

METHOD FOR LOADING AND UNLOADING LARGE AREA TRANSPORTATION MEANS

CROSS-REFERENCES TO RELATED APPLICATIONS

This application is a continuation of Ser. No. 555,423, filed Nov. 23, 1983, now abandoned, which is a continuation of Ser. No. 387,001, filed June 10, 1982, now abandoned.

BACKGROUND OF THE INVENTION

The invention relates to a method for loading and unloading large area transportation means, such as ships or the like, by means of a vertically spirally curved conveyor connected to goods loading and unloading means, in which the goods to be conveyed are discharged or taken up by a pivotable and optionally telescopical horizontal conveyor arranged on the lower end section thereof, as well as a goods transfer means for performing the method.

For performing methods of the aforementioned type, it is known to use vertical curved conveyors comprising spiral conveyor segments extending over a conveyor area of 360°, which can be motor-driven in reversible manner with respect to the conveying direction and are interconnected in module-like manner and fixed to a central supporting column and a supporting frame. The supporting column and frame are connected to an upper top part, which simultaneously serves as the goods transfer mechanism for goods loading and unloading means located outside the large area transportation means. On the lower end portion of the vertical curved conveyor is provided a horizontal conveyor, which is for example constructed as a telescopical conveyor belt with a reversible conveying direction, the end conveyor located on the free end portion being vertically pivotable for taking up or discharging goods. The lower spiral conveyor segment is associated with the horizontal conveyor having an invariable goods transfer section. This means that when the horizontal conveyor performs a pivotal movement, the lower spiral conveyor segment also rotates coaxially to the longitudinal axis of the vertical conveyor and the upper conveyor section of the lower spiral conveyor segment is displaced relative to the lower conveyor portion of the non-rotary spiral conveyor segment of the vertical conveyor located above the lower spiral conveyor segment. This leads to the disadvantage that the facing conveyor portions of the said spiral conveyor segments must undergo a height displacement relative to one another, so that a vertical conveyor constructed for loading the transportation space with goods cannot be immediately used for the unloading of said space, because the goods are placed on the lower conveyor portion of the non-rotary spiral conveyor segment. This problem similarly occurs if a vertical conveyor originally intended for unloading goods is used for loading goods. In such cases, it is necessary to avoid an accumulation of goods by transferring the same in a manual manner or by additionally installed auxiliary devices, which is prejudicial to speedy loading and/or unloading operations.

BRIEF SUMMARY OF THE INVENTION

The object of the invention is to provide a method, which makes it possible to both load and unload large area transportation means with a vertical conveyor, without the transportation of the goods being impeded by an accumulation thereof and without necessitating manual work after reversing the goods conveying direction. In addition, means are to be provided, which permit the method to be performed.

According to the invention, this object is achieved in that during loading and unloading the goods transfer spiral which is in fixed operative connection with the horizontal conveyor is moved over the entire pivoting area in congruent manner to the lower spiral conveyor segment of the vertical conveyor and, for loading, the goods transfer spiral is moved beneath the spiral conveyor segment, whereas for unloading it is moved over the spiral conveyor segment in such a way that an overlapping zone is always formed between the lower spiral conveyor segment and the goods transfer spiral.

According to a further feature of the invention, the goods transfer means for performing the method is constructed in such a way that on the goods transfer side the horizontal conveyor is in operative connection with a goods transfer spiral constructed as a spiral conveyor segment, said goods transfer spiral being synchronously movable with the horizontal conveyor above or below the lower spiral conveyor segment during the pivoting of the horizontal conveyor and can be raised or lowered by means of a reversing device relative to the lower spiral conveyor segment.

BRIEF DESCRIPTION OF THE DRAWINGS

Further features of the invention are described below and are illustrated hereinafter by means of an exemplified goods transfer means represented in the drawings, wherein is shown.

DETAILED DESCRIPTION OF THE PREFERRED EMBODIMENTS

Figure 1:
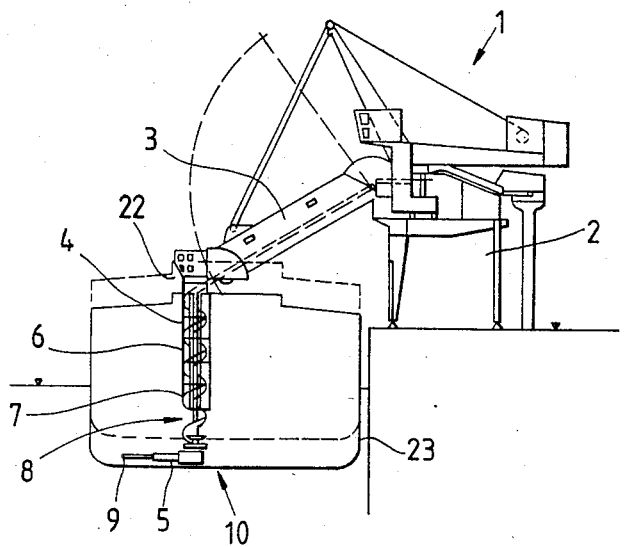
FIG. 1 a loading and unloading means with a vertical conveyor and a goods transfer means according to the invention in a diagrammatic side view.
Figure 4:
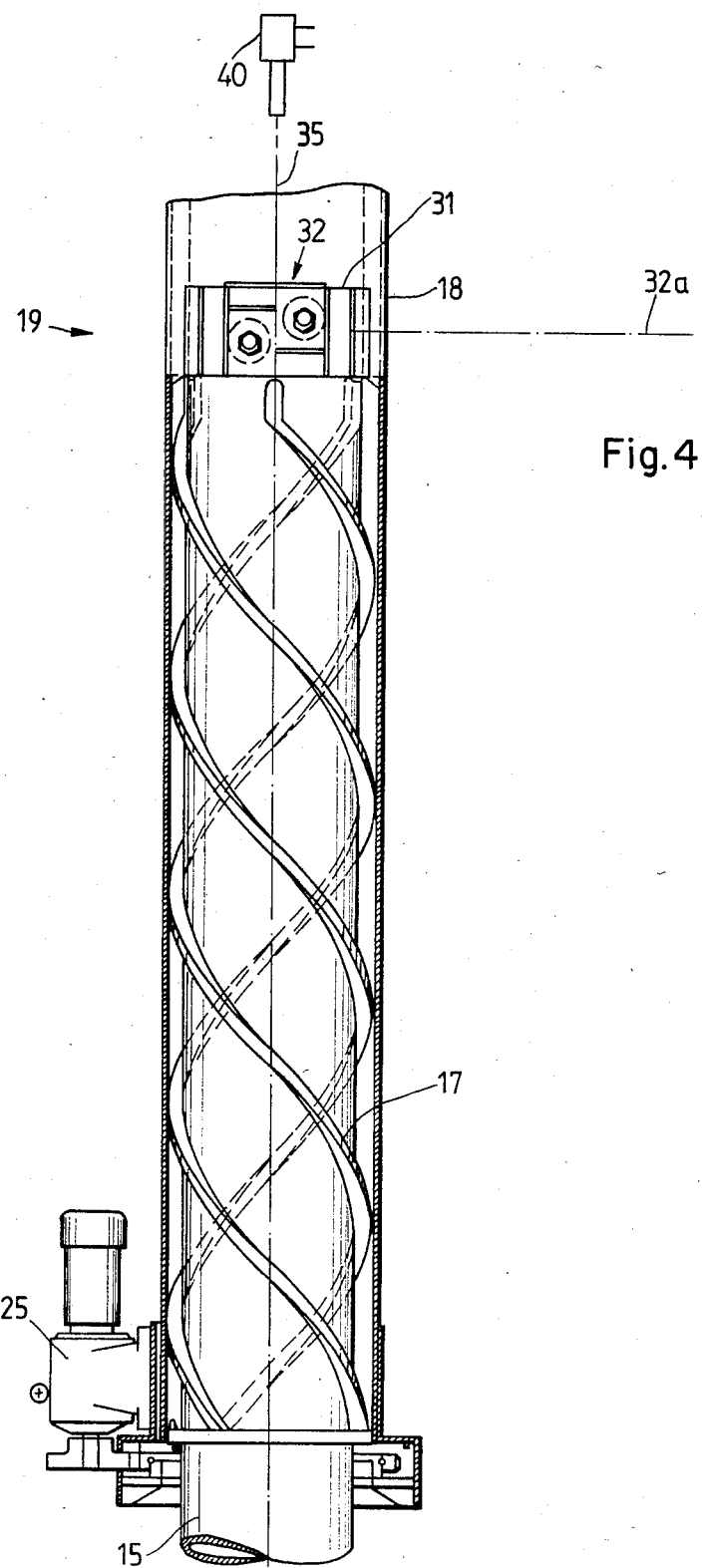
FIG. 4 the holding mechanism for the goods transfer means of FIG. 3 in side view and in part section.

FIG. 1 diagrammatically shows a loading and unloading means 1 used for loading and unloading a ship 23. The loading and unloading means 1 has a gantry truck, which can be moved along the quay. On gantry truck 2 is provided an arm or jib 3 with a conveyor belt, on the free end portion of which is provided a holding platform 22, to which is fixed a vertical conveyor 4. Vertical conveyor 4 projects into the hold of ship 23 and comprises various spiral conveyor segments 6 and a lower spiral conveyor segment 7. Each of the spiral conveyor segments 6 and the lower spiral conveyor segment 7 has a conveyor belt portion helically curved through a range of 360°, which is driven in reversible manner by a motor. On the lower end portion of vertical conveyor 4 there is a goods transfer means 10 comprising a goods transfer spiral 8, on the lower goods transfer portion of which is placed a horizontal conveyor 5. Horizontal conveyor 5 can be constructed telescopically and has a vertically pivotable end conveyor 9. The goods transfer spiral 8 is connected to a frame 12 formed from frame rods 29 by the connectors 28. Frame 12 can be spatially varied with respect to frame 13 of vertical conveyor 4. Frame 13 comprises vertical locking rods 26 which surround conveyor 4 as a protective means. The spiral conveyor segments 6 of vertical conveyor 4 are connected by means of fixing members 33 to the holding tube 18, which is positioned coaxially to the longitudinal axis 35 of vertical conveyor 4 (FIG. 4). The spiral conveyor segments 6 are connected to frame 13 by conductors 27.

In the lower area, the frame rods 29 of frame 12 are connected to a base plate 14, to which is articulated horizontal conveyor 5. The horizontal conveyor can be operated by means of a hydraulic servo-drive 24, for example.

Figure 3:
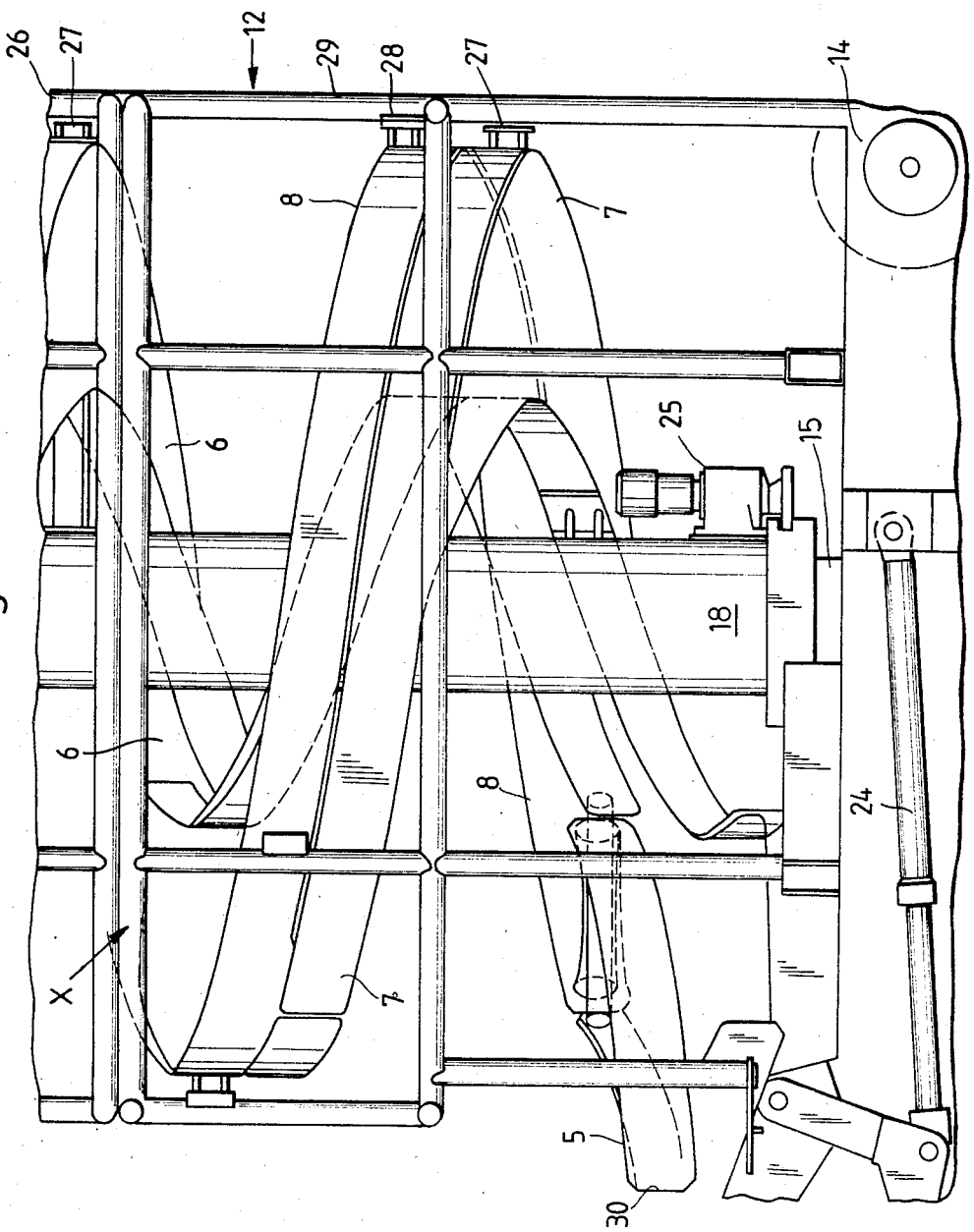
FIG. 3 the goods transfer means of the vertical conveyor of FIG. 2 as a detail in a larger-scale side view.

The goods transfer spiral 8 is connected by means of fixing member 28 to frame rods 29 of frame 12 (FIG. 3). On holding tube 18 is also provided a drive motor 25, which serves to pivot the goods transfer spiral 8 about vertical axis 35. FIG. 3 also indicates that on operating the hydraulic servo-drive 24, horizontal conveyor 5 is pivoted in a vertical plane.

Figure 5:
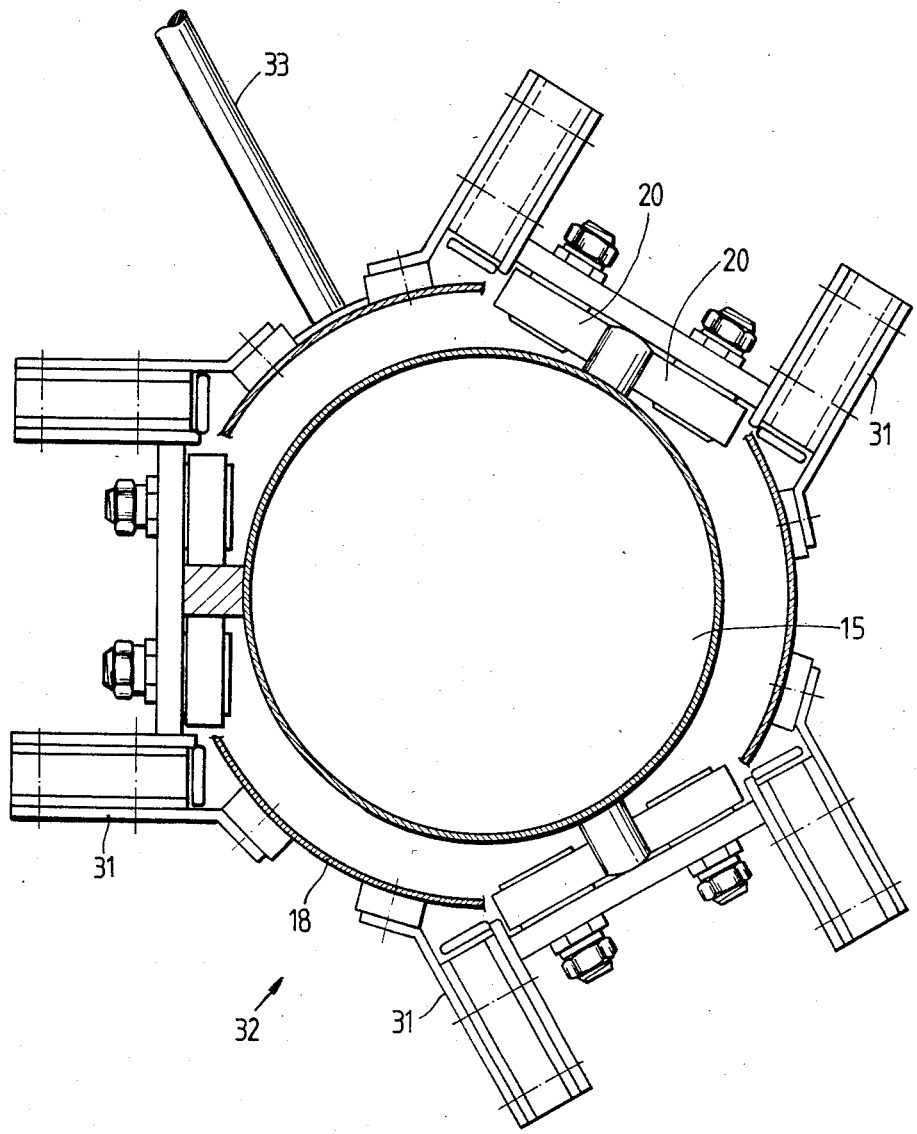
FIG. 5 the guide piece of the goods transfer means in plan view.

The base plate 14 is centrally connected to a lifting column 15 having guide rails 17 extending over the height of the goods transfer spiral 8 and which are located within holding tube 18. Guide rails 17 are helically coiled and are displaced in the same direction to one another. A guide piece 32 is fixed in holding tube 18 in plane 32a of the upper end portion of the lower spiral conveyor segment 7 (FIGS. 4 and 5). Guide piece 32 comprises three roll holders 31, which are at an angle of 120° to one another. Each roll holder 31 has two guide rolls 20 displaced in height relative to one another in such a way that on inserting guide rails 17 into guide piece 32 they engage on said rails 17. The roll holders 31 are joined to the holding tube 18. Guide rails 17 are displaced relative to one another by an integral fraction of 360°. Lifting column 15 is operated by means of a servo-drive, constructed as a hydraulic lifting cylinder 40 shown in FIG. 4 and which can be positioned on holding platform 22.

For loading and unloading by means of the loading and unloading means, it is necessary on reversing from loading to unloading or vice versa, to so position the goods transfer spiral 8 with respect to the lower spiral conveyor segment 7 that there can be no accumulation of goods. To this end when there is to be a reversal of the loading process, the goods transfer spiral 8 is rotated so far out of the area of the lower spiral conveyor segment 7 that the upper end portion 8a of spiral 8 is below the lower end portion 7a of the lower segment 7. By means of drive motor 25, or optionally by hand, the goods transfer means 10 with the goods transfer spiral 8 can be rotated by 120°. Special stops prevent any risk of rising above or dropping below these geometrical values. This 120° displacement ensures that on again rotating up frame 12 with goods transfer spiral 8, the latter is located in a predetermined manner above or below the lower the spiral conveyor segment 7. (FIG. 6).

Figure 6:
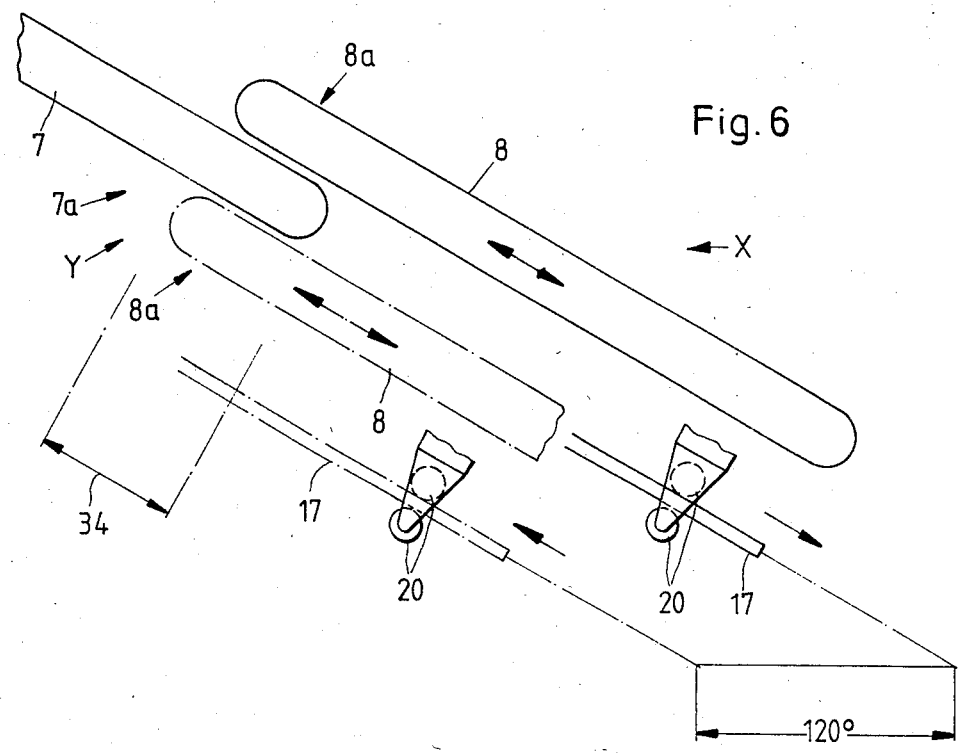
FIG. 6 a diagrammatic view of the upper spiral portion of the goods transfer spiral in the loading and unloading position.
Figure 2:
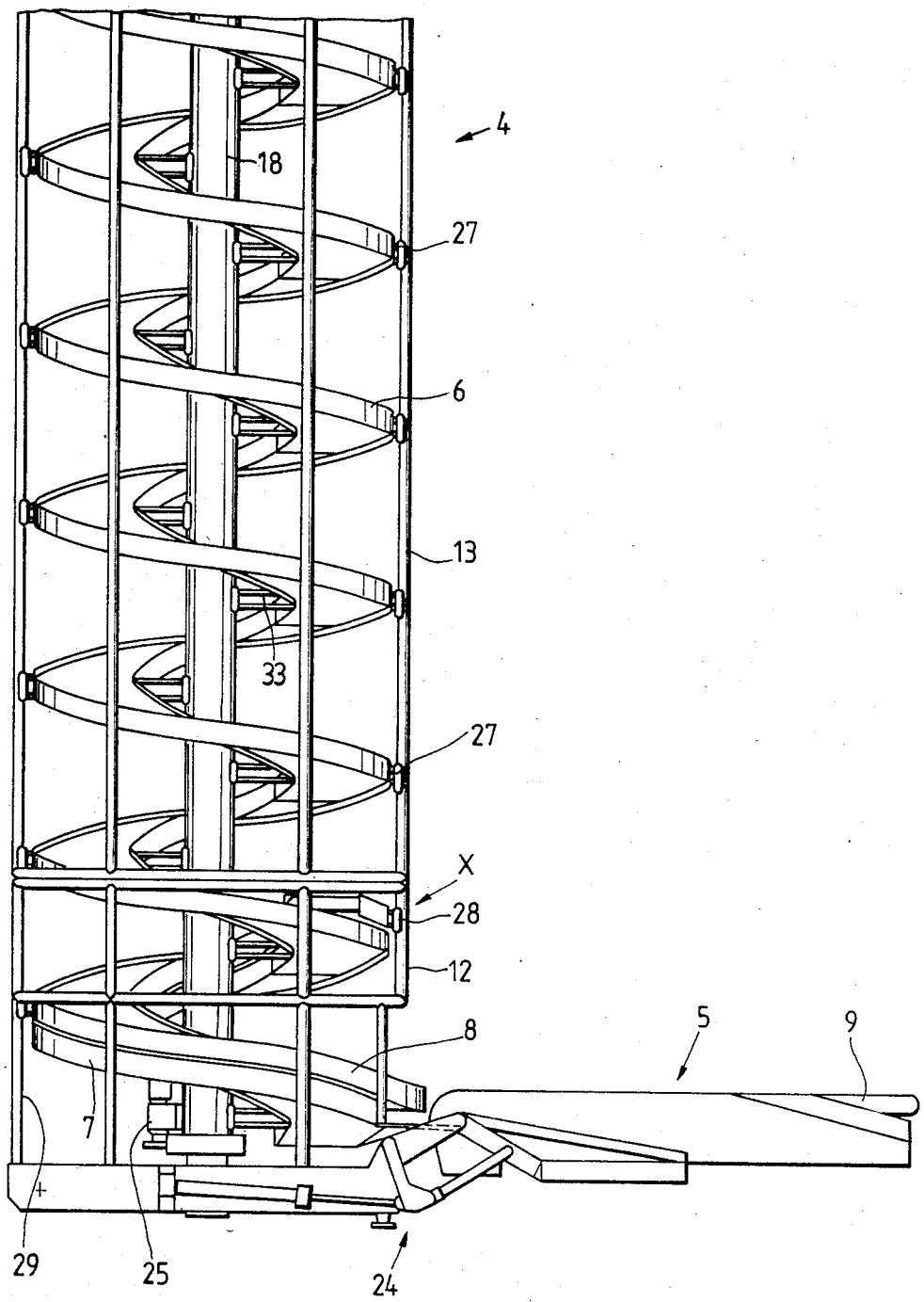
FIG. 2 the vertical conveyor of FIG. 1 in a larger-scale view in cutaway form and from the side.

FIG. 6 diagrammatically shows the association of the lower end portion 7a of the lower spiral conveyor segment with the upper end portion 8a of the goods transfer spiral 8. In the discharge position X, the upper end portion 8a of goods transfer spiral 8 is located above the lower end portion 7a of the spiral conveyor segment 7. However, on loading, end portion 8a of the goods transfer spiral is below the spiral conveyor 8a is position Y. The amount of overlap is indicated by the numeral 34.

The goods transfer means permits a simple reversal of a loading and unloading means of the present type from an unloading position X to a loading position Y and visa versa. As the movement processes of the goods transfer means are performed either by drive motor 25 or by a hydraulic servo-drive of e.g. the holding platform 22, there is also no need for the manual working in the vicinity of goods transfer means 10 on reversing the loading process.

What is claimed is:

1. A method for loading and unloading goods from large area transportation means, such as ships or the like, by means of a vertical spirally curved conveyor connected to goods loading and unloading means at the upper end, a pivotable horizontal conveyor (5) arranged on the lower end portion of the vertical conveyor for receiving or discharging the goods, and a lower spiral conveyor segment and goods transfer spiral interposed between the vertical and horizontal conveyors; in which method during loading and unloading, the goods transfer spiral (8) which is in fixed operative connection with the horizontal conveyor (5) is moved over the entire pivoting area in a congruent manner to the lower spiral conveyor segment (7) of the vertical conveyor (4) and for loading the goods transfer spiral is moved beneath the spiral conveyor segment, whereas for unloading it is moved over the spiral conveyor segment in such a way that an overlapping zone is always formed between the lower spiral conveyor segment and the goods transfer spiral; in which the goods transfer spiral (8) is moved downwards by the simultaneous rotation and lowering in accordance with the curved spiral of the vertical conveyor until the goods transfer spiral (8) is spaced from the lower end portion of the lower spiral conveyor segment (7), and in which the goods transfer spiral (8) is then horizontally rotated about the longitudinal axis of the vertical conveyor until the goods transfer spiral (8) is moved below the lower spiral conveyor segment for loading and above the lower spiral conveyor segment for unloading.

* * * * *